(12) United States Patent
Roberts

(10) Patent No.: US 8,446,031 B2
(45) Date of Patent: May 21, 2013

(54) APPARATUS FOR CONVERTING ENERGY FROM WAVE OR CURRENT FLOW USING PIPES ACTING AS VENTURI PUMPS

(75) Inventor: Peter Roberts, Surrey (GB)

(73) Assignee: Verderg Ltd, Knaphill (GB)

( * ) Notice: Subject to any disclaimer, the term of this patent is extended or adjusted under 35 U.S.C. 154(b) by 698 days.

(21) Appl. No.: 12/375,405

(22) PCT Filed: Jun. 20, 2007

(86) PCT No.: PCT/EP2007/055650
§ 371 (c)(1),
(2), (4) Date: Apr. 23, 2010

(87) PCT Pub. No.: WO2008/015047
PCT Pub. Date: Feb. 7, 2008

(65) Prior Publication Data
US 2010/0207393 A1    Aug. 19, 2010

(30) Foreign Application Priority Data

Aug. 3, 2006 (GB) .................................. 0615403.3
Nov. 23, 2006 (GB) .................................. 0623368.8

(51) Int. Cl.
*F03B 13/00* (2006.01)
(52) U.S. Cl.
USPC ............................................. 290/54; 290/53
(58) Field of Classification Search
USPC ................. 290/42, 43, 44, 53, 54, 55; 60/398
See application file for complete search history.

(56) References Cited

U.S. PATENT DOCUMENTS

| 2,376,536 | A | | 5/1945 | Gonzer | 230/92 |
| 4,179,886 | A | * | 12/1979 | Tsubota | 60/398 |
| 4,208,873 | A | * | 6/1980 | Foglia | 60/398 |
| 4,504,192 | A | * | 3/1985 | Cyrus et al. | 416/41 |
| 4,960,363 | A | * | 10/1990 | Bergstein | 415/3.1 |

(Continued)

FOREIGN PATENT DOCUMENTS

| DE | 41 05 499 | 8/1992 |
| EP | 0 931 931 | 7/1999 |

(Continued)

*Primary Examiner* — Tulsidas C Patel
*Assistant Examiner* — Viet Nguyen
(74) *Attorney, Agent, or Firm* — Seed IP Law Group PLLC

(57) ABSTRACT

Apparatus for generating electricity using tidal, wave or current flow in a body of water, comprising: an arrangement of first (10) and second (11) pipes, each first pipe (10) being provided with a series of holes (12a, 12b, 13a, 13b) spaced along its length, and the first pipes being arranged relative to the second pipes such that a venturi is defined between the walls of adjacent first and second pipes near the holes; a flow conduit having an inlet and an outlet; an impeller located in the flow conduit; and a generator connected to the impeller; wherein water from the body can enter the flow conduit via the inlet, and the first pipes are connected to the outlet of the flow conduit such that flow of water past the arrangement of first (10) and second (11) pipes causes the first pipes (10) to act as venturi pumps inducing flow from the inside of the first pipes through the holes (12, 13) so as to draw water through the flow conduit and drive the impeller.

32 Claims, 12 Drawing Sheets

U.S. PATENT DOCUMENTS

| | | | |
|---|---|---|---|
| 5,709,419 A * | 1/1998 | Roskey | 290/55 |
| 6,239,506 B1 * | 5/2001 | Roskey | 290/55 |
| 6,437,457 B2 * | 8/2002 | Roskey | 290/55 |
| 2005/0017514 A1 * | 1/2005 | Tocher | 290/55 |
| 2005/0099011 A1 | 5/2005 | Rochester et al. | 290/43 |
| 2010/0007152 A1 * | 1/2010 | Roskey | 290/55 |
| 2010/0213720 A1 * | 8/2010 | Bailey et al. | 290/55 |

FOREIGN PATENT DOCUMENTS

| | | |
|---|---|---|
| GB | 1 381 295 | 1/1975 |
| WO | 03/081029 | 10/2003 |
| WO | 03/081030 | 10/2003 |
| WO | 2005/075818 | 8/2005 |

* cited by examiner

APPARATUS FOR CONVERTING ENERGY FROM WAVE OR CURRENT FLOW USING PIPES ACTING AS VENTURI PUMPS

TECHNICAL FIELD

This invention relates to systems for converting wave, tidal or current energy in a body of water into a more useful form of energy. In particular, the invention provides apparatus for generating electricity using flows such as waves, tides or currents in a body of water.

BACKGROUND ART

There have been many proposals for converting wave or tidal flows into electricity as a non-polluting approach to power generation.

Previous systems for extracting energy from waves used the vertical movement of the water surface caused by the phase shift between the elliptical water particle paths along a wavelength. Typically, previous devices involved some form of float coupled to a mechanical arrangement or some form of trapped air body above the wave surface for converting the periodic vertical movement of the wave surface into some form of motion useful for electricity generation (usually rotary). Such systems are often mechanically complicated and to work effectively are tuned to resonate at a frequency at which the energy density of the ambient wave spectrum is expected to peak. Output can drop dramatically if the wave frequency differs from this design resonant frequency. Such systems are useless if there is only lateral flow (current or tide) with no oscillating vertical wave component.

Systems have been proposed for extracting energy in lateral flows. Such systems have involved the use of a vane which can be caused to oscillate by the flow, a mechanical transmission system converting this into rotary motion. These systems face similar problems to wave-powered systems: mechanical complexity, tuned behaviour, unable to extract energy from other types of motion, etc. Other systems feature a large underwater propeller with an electrical power generator in the hub, analogous to a windmill but for water instead of wind flows. For the swept disc to gain exposure to the maximum incident current energy, the blades have to be very long which in turn requires sophisticated design and materials to accommodate the stresses at the blade root. Offshore tidal barrages seek to concentrate the incident energy of a large cross-section of water flow by trapping the flow behind a containing wall and funneling it through turbines of much smaller cross-sectional area, as in a conventional dam. Such barrages, typically across a tidal estuary, are very expensive and environmentally disruptive.

One common problem for all these wave or flow systems is to address a sufficiently large cross-section of the ocean for power generation to be possible on an industrial scale. Furthermore, end or edge effects can make it easier for the flow to go around any structure positioned in the flow to extract energy from it rather than to pass through the energy extraction system. This problem can be lessened by making an installation very large but this in turn can lead to further complexity and expense and may lead beyond the limits of current engineering capability.

This invention seeks to overcome some of the disadvantages outlined above. In particular, the invention seeks to provide a system that is inherently very large and not very susceptible to variations of flow direction, strength and frequency. The invention also seeks to provide a system that can extract energy from waves yet which is relatively simple in mechanical terms and capable of being built, installed and maintained by existing facilities.

DISCLOSURE OF THE INVENTION

This invention provides apparatus for generating electricity using tidal, wave or current flow in a body of water, comprising:
an arrangement of first and second pipes, each first pipe being provided with a series of holes spaced along its length, and the first pipes being arranged relative to the second pipes such that a venturi is defined between the walls of adjacent first and second pipes near the holes;
a flow conduit having an inlet and an outlet;
an impeller located in the flow conduit; and
a generator connected to the impeller;
wherein water from the body can enter the flow conduit via the inlet, and the first pipes are connected to the outlet of the flow conduit such that flow of water past the arrangement of first and second pipes causes the first pipes to act as venturi pumps inducing flow from the inside of the first pipes through the holes so as to draw water through the flow conduit and drive the impeller.

The invention addresses the problems outlined above by using the flow to drive a venturi pump system which in turn draws water through an impeller.

The series of holes preferably comprises a row of holes extending axially along the side of the first pipe. It is particularly preferred that the series of holes comprises a pair of parallel, symmetrical rows of holes. The holes can be elongated in the form of slots.

It is preferred that non-return valves are provided at the holes such that water can flow through the holes out of the first pipes but not through the holes into the first pipes.

One form of non-return valve comprises a flap of flexible material secured to the outside of the first pipe and extending over at least one hole, such that, in use, the induced flow lifts the flap off the hole and allows outward flow but reverse flow pushes the flap against the hole and prevents flow therethrough. The flap can cover more than one hole.

Where the series of holes comprises a pair of parallel, symmetrical rows of holes, a particularly preferred form of flap arrangement comprises a separate flap arrangement extending over each row of holes. In one embodiment, a flap arrangement is secured on each side of the pair of hoes, the free edges of the flaps lying between the two rows of holes. In another embodiment, the flap arrangements are secured between the rows of holes, respective flaps extending over respective rows.

The arrangement of first and second pipes preferably comprises arrays of first and second pipes arranged in a parallel, spaced planar array. The plane of the arrays is typically vertical or close thereto. In one embodiment, the plane of the array of first pipes is substantially parallel to and offset from that of the array of second pipes. In another embodiment, the arrays of first and second pipes are substantially coplanar, the pipes of one array being interleaved with those of the other In one preferred embodiment, the first and second pipes extend in a substantially vertical direction, and the first pipes can be connected to a horizontal manifold at their lower ends, the manifold in turn being connected to the flow conduit. In another preferred embodiment, the first and second pipes extend in a substantially horizontal direction, and the first pipes can be connected to a vertical manifold, the manifold in turn being connected to the flow conduit.

Preferably, the arrangement of first and second pipes comprises first and second sections inclined towards each other towards their upper ends.

The flow conduit typically defines a shroud surrounding the impeller. The impeller can be located near a lower end of the arrangement of the first and second pipes, and the generator can be located near an upper end of the arrangement of first and second pipes. Where the impeller and generator are so separated, the generator can be connected to the impeller by means of a long drive shaft. It is particularly preferred that the generator is mounted such that when the apparatus is positioned in the body of water, the generator is above the water level.

Buoyancy members can be provided and arranged such that the apparatus will float in the body of water with the arrangement of first and second pipes substantially submerged in the body of water. In such a case, the apparatus is preferably moored using lines attached to the bed of the body of water. These lines can be adjustable to allow the alignment of the apparatus to be adjusted so as to optimise flow past the pipes.

The buoyancy member can be open-bottomed column so that can fill with water (e.g. from the lower, horizontal manifold) with a closed air volume above the water surface inside the column. Preferably, means are provided for adjusting the air pressure in the column so as to fine-tune the air volume. It is particularly preferred to connect the column to the flow conduit such that the closed volume of air can expand when the flow in the flow conduit is high and its pressure low and partly empty the column into the conduit past the impeller, and when the flow is low and its pressure high, the water to flow back in up the column.

The columns can be used to mount the generators and, optionally the impellers.

In one particularly preferred embodiment, the arrays define a elongate fence of first and second pipes. In one such case, a pair of fences can be provided, one end of each fence being connected at a common location and the other ends being spaced apart such that the fences from a V shape. Preferably, the open end of the V faces a principal direction of tide or current flow. A development of this embodiment comprises two pairs of fences, one end of each fence being connected at the common location and the ends being spaced to form an X shape. In this case, there are effectively two Vs with the open ends facing opposite directions and therefore being open to the two principal tidal flow directions.

The pipes forming the arrays are typically connected flexibly such that the fence can deform from a planar arrangement under the effect of tidal or current flow. The flexible connections can be provided by a manifold at the bottom of the fence and one or more flexible cables above the manifold, the cables being more flexible than the manifold.

A reservoir can be provided at the common location to which the fences are connected, the outlet of the flow conduits feeding into the reservoir. The reservoir is arranged to release stored water into the apparatus at times of low tidal or current flow. In this case, the impeller can be mounted in a wall of the reservoir. In a further development, the outer ends of the fences are connected to further reservoirs which also act to support the end of the fence.

One embodiment of the invention further comprises reverse-osmosis desalination equipment and a delivery pipeline system, the desalination equipment and pipeline system being powered by the generator. Other uses can be to use the local generation of electricity to power local generation of hydrogen by electrolysis. The hydrogen (and oxygen) thus produced can be piped ashore in conventional pipelines. It may also be possible to provide local storage for the gas(ses) which can then be fed ashore at a constant rate.

MODE(S) FOR CARRYING OUT THE INVENTION

Figure 1:
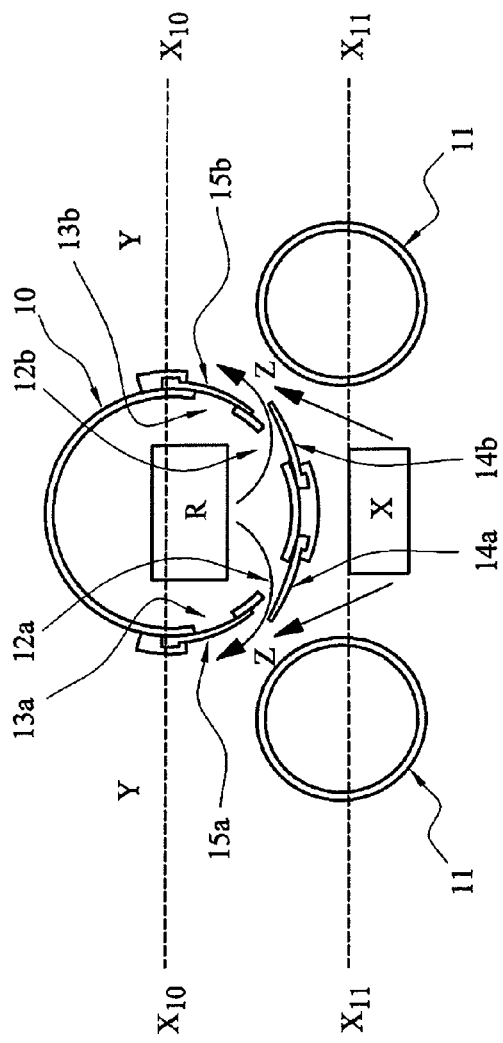
FIGS. 1 and 2 show a plan views of part of a pipe arrangement of an embodiment of the invention.
Figure 2:
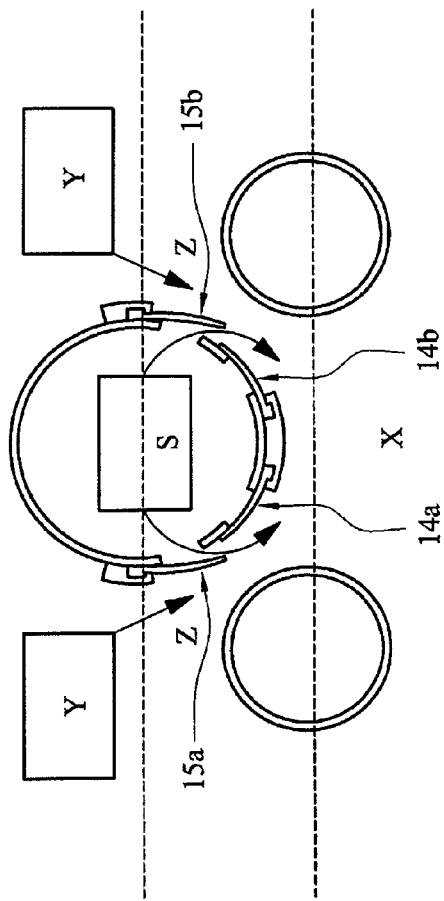

The basic principle of the invention is to use the arrangement of first and second pipes to draw water over the impeller to generate electricity. FIGS. 1 and 2 show a plan views of part of a pipe arrangement to demonstrate the principle of operation. The arrangement comprises arrays of first and second pipes 10, 11. The pipes in each array are arranged in a parallel spaced, side-by-side array, all pipes of an array lying in essentially the same plane (indicated $X_{10}$-$X_{10}$ and $X_{11}$-$X_{11}$ respectively). The arrays are offset such that the first pipes 10 are aligned with the spaces between the second pipes 11. The pipes of the first array adjacent to pipe 10 are not shown but their position is indicated (10−1) and (10+1), the array extending further in both directions. The second array extends similarly.

The first pipes 10 are provided with two rows of pairs of holes 12a, 13a, 12b, 13b the holes being positioned such that they face the two adjacent second pipes 11. The two arrays of pipes 10, 11 are positioned relatively close to each other such that water flowing across the arrangement from one side to the other X->Y (FIG. 1) or Y->X (FIG. 2) is forced between the first and second pipes 10, 11 where space is more restricted Z. The effect of this flow restriction is to accelerate the water leading to a drop in pressure, i.e. a venturi is formed. As the pressure outside the holes 12a, 12b, 13a, 13b is reduced, water at ambient pressure inside the first pipes 10 will flow R, S out of the holes into the venturi Z.

Non-return valves 14a, 14b, 15a, 15b provided at each hole 12a, 12b, 13a, 13b to prevent water flowing into the first pipe if the ambient pressure in the pipe is lower than the pressure outside the pipe.

Figure 3:
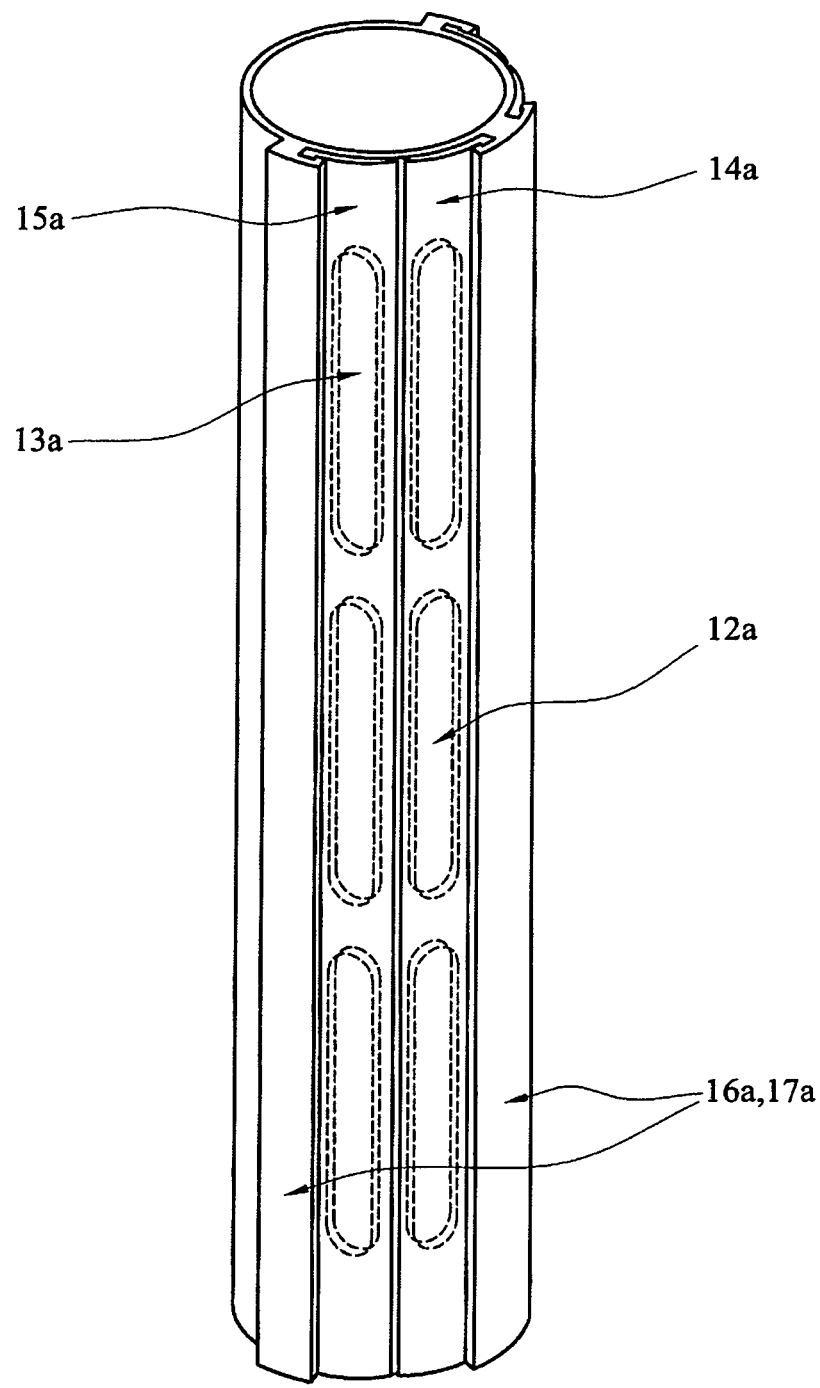
FIG. 3 shows an embodiment of a first pipe of FIGS. 1 and 2.

FIG. 3 shows further detail of the first pipe 10. The holes 12a, 13a are in the form of two parallel, symmetrical rows of elongate slots. The valves 14a, 15a comprise long, flexible flaps secured by respective retaining lips 16a, 17a on the outside of the pipe 10, the flaps 14a, 15a being secured such that they extend towards each other overlying the respective adjacent row of holes 12a, 13a. The flaps 14a, 15a can be made of any suitable material depending on application, e.g. natural or synthetic rubber, thermoplastic materials, woven materials, composite materials, etc.

Figure 4:
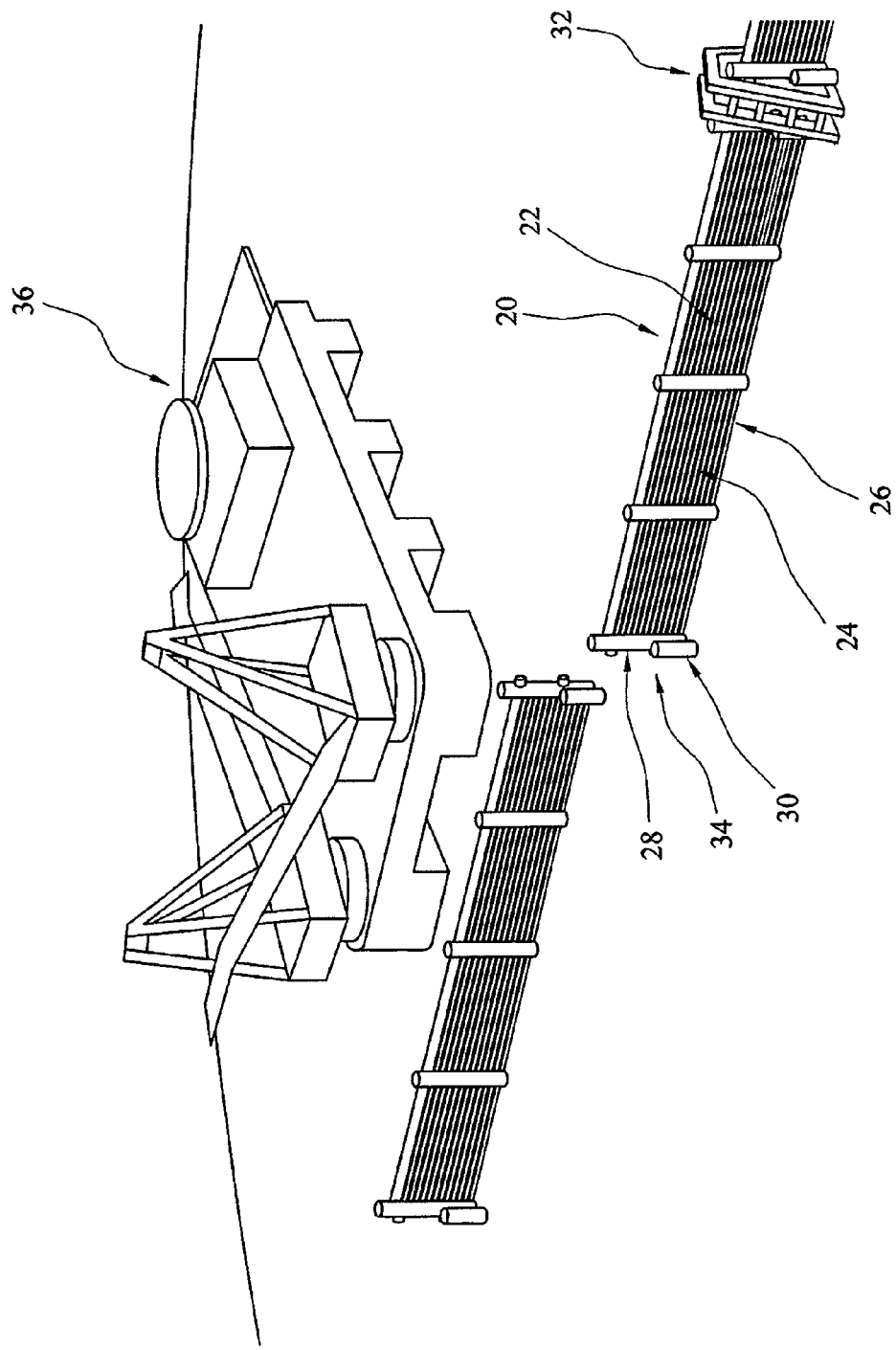
FIG. 4 shows a first embodiment of the invention.

FIG. 4 shows an embodiment of the invention being installed on the sea bed. The apparatus comprises a series of pipe sections 20 comprising interleaved, planar arrays of first and second pipes shown generally at 22, the first and second pipes being aligned substantially horizontally and the arrays having a substantially vertical plane. The pipes 22 extend between vertical manifold pipes 24, the interior of the first pipes communicating with the interior of the vertical manifold pipes 24. The vertical manifold pipes 24 are all connected to a common manifold 26 which runs along the bottom of the section 20. The end vertical manifolds comprise support columns 28 which carry a flow conduit 30 housing an impeller (not shown) at its lower end. A generator module 32 is mounted at the top of each column 28, connected to the impeller by a drive shaft.

The sections 20 are mounted on the sea bed between support structures 34. The sections 20 can be installed from a barge or platform 36 which can be removed once the installation is complete. The sections 20 can, for example, have dimensions of the order of 150 m×30 m.

In the embodiment of FIG. 4, the apparatus is mounted below the surface in relatively shallow water and so is essentially subject only to flow due to current or tide. Operation of this system is essentially as described in relation to FIGS. 1 and 2. Flow of water through the section between the first and second pipes causes a reduction of pressure in the venturi which draws water out of the first pipes. Consequently, water is drawn through the flow conduit 30 and into the manifold 26, driving the impeller and hence powering the generator module 32. Vertical variations in flow can cause lower pressures to be generated in some pipes than others. The non-return valves prevent these variations from 'short-circuiting' the system via the manifold by preventing water from entering the pipes other than through the flow conduit and manifold.

Figure 5:
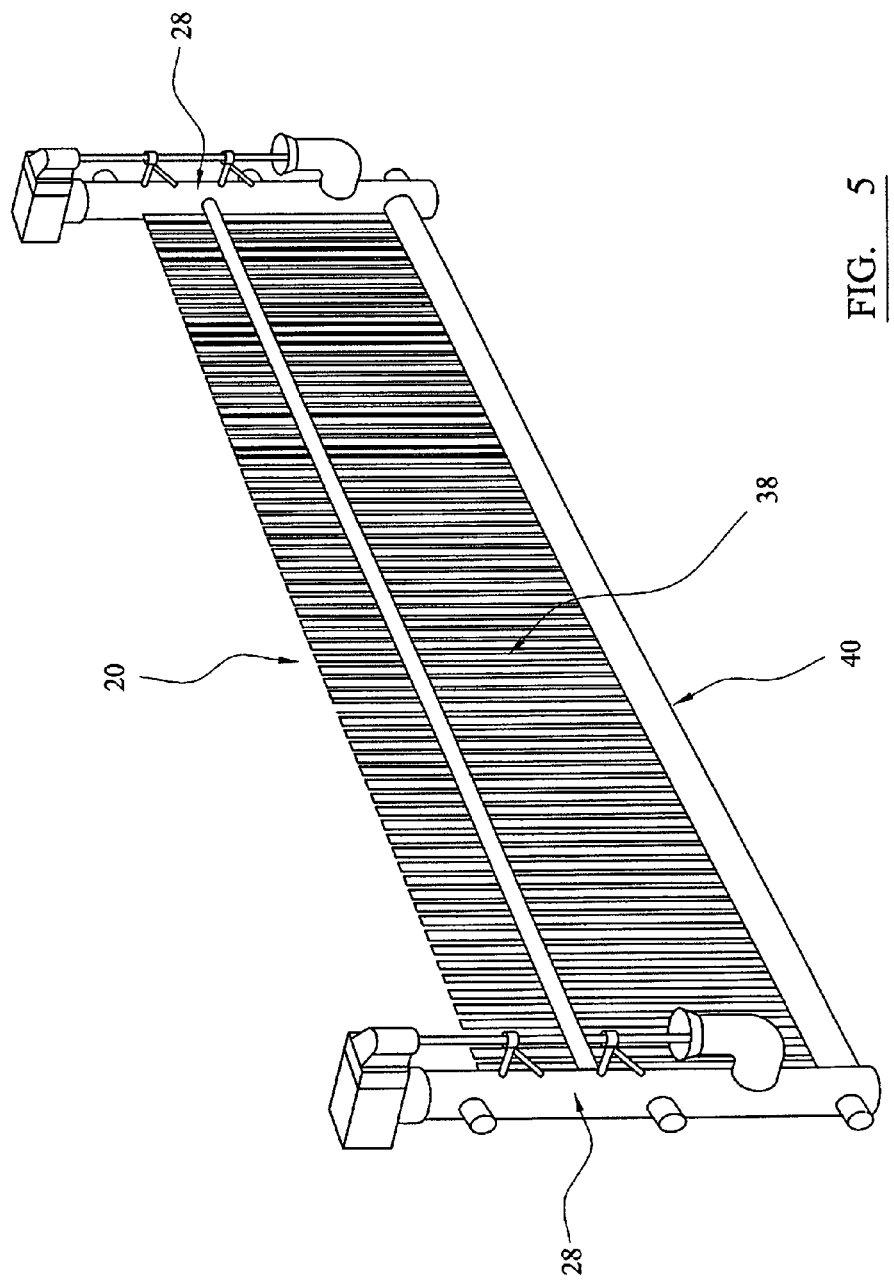
FIG. 5 shows a second embodiment of the invention.

FIG. 5 shows a different arrangement of pipes for the sections 20. In this case, the first and second pipes are arranged substantially vertically 38 and connected to a common horizontal manifold 40 which extends between the columns 28. With the pipes in this configuration, energy can be extracted from orbital water flows such as are found in wave patterns.

Figure 6:
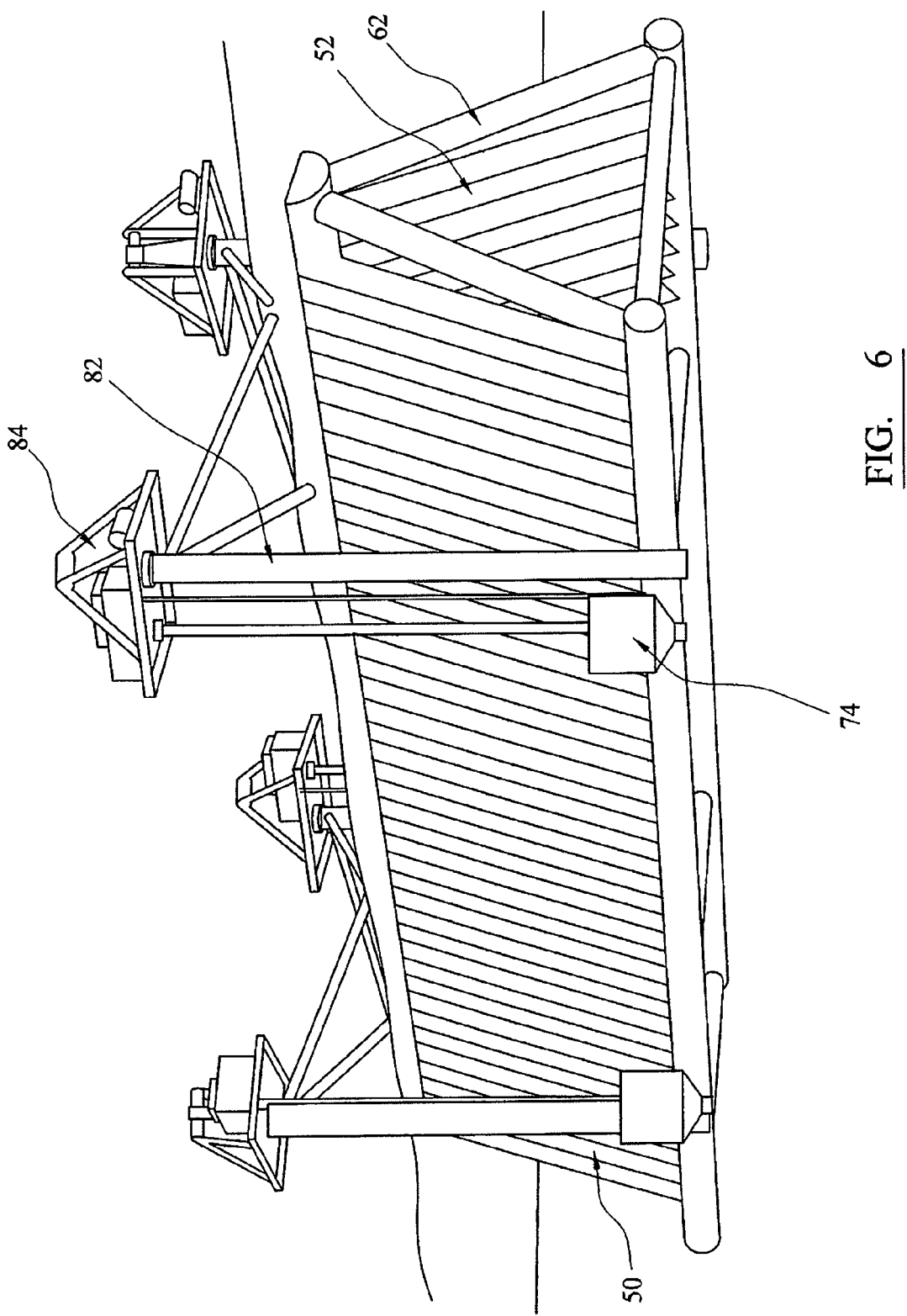
FIGS. 6, 7 and 8 show a third embodiment of apparatus according to the invention.
Figure 7:
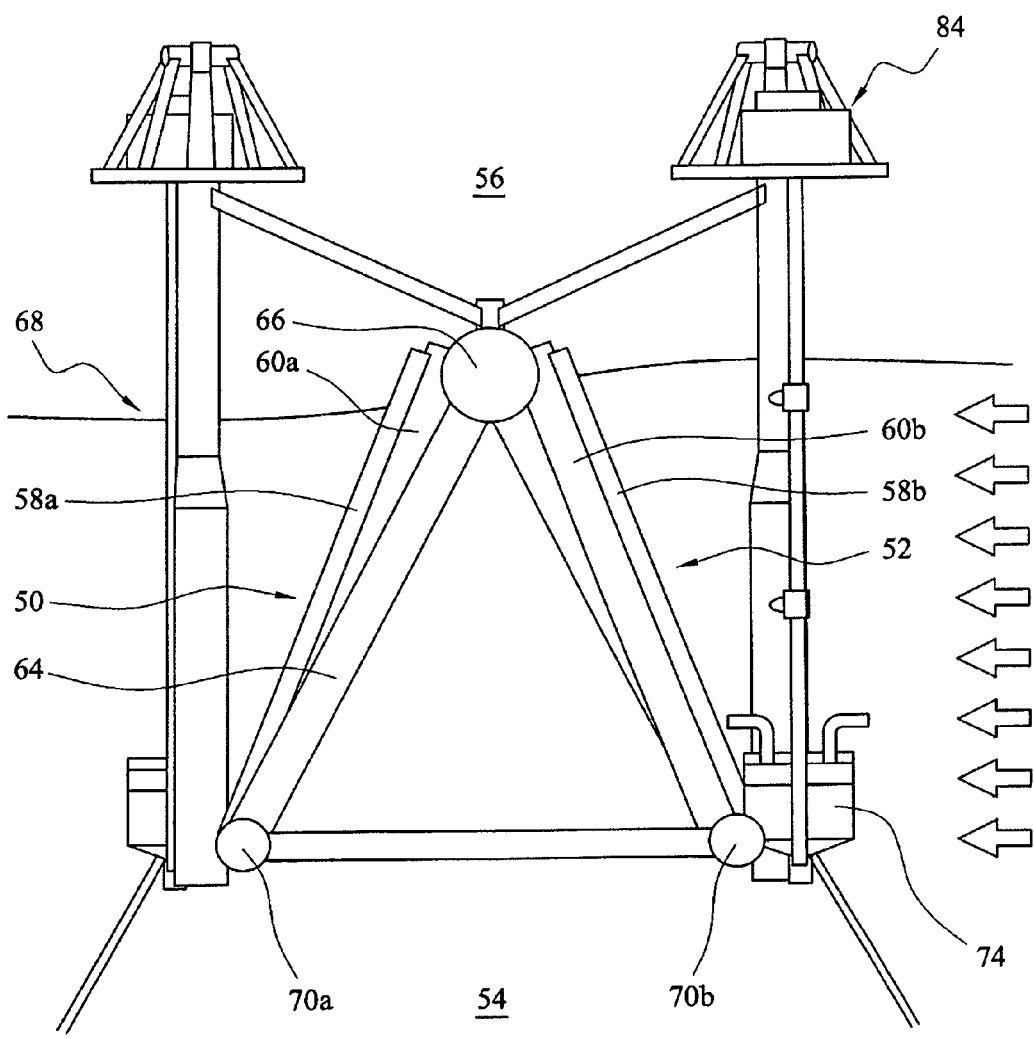
Figure 8:
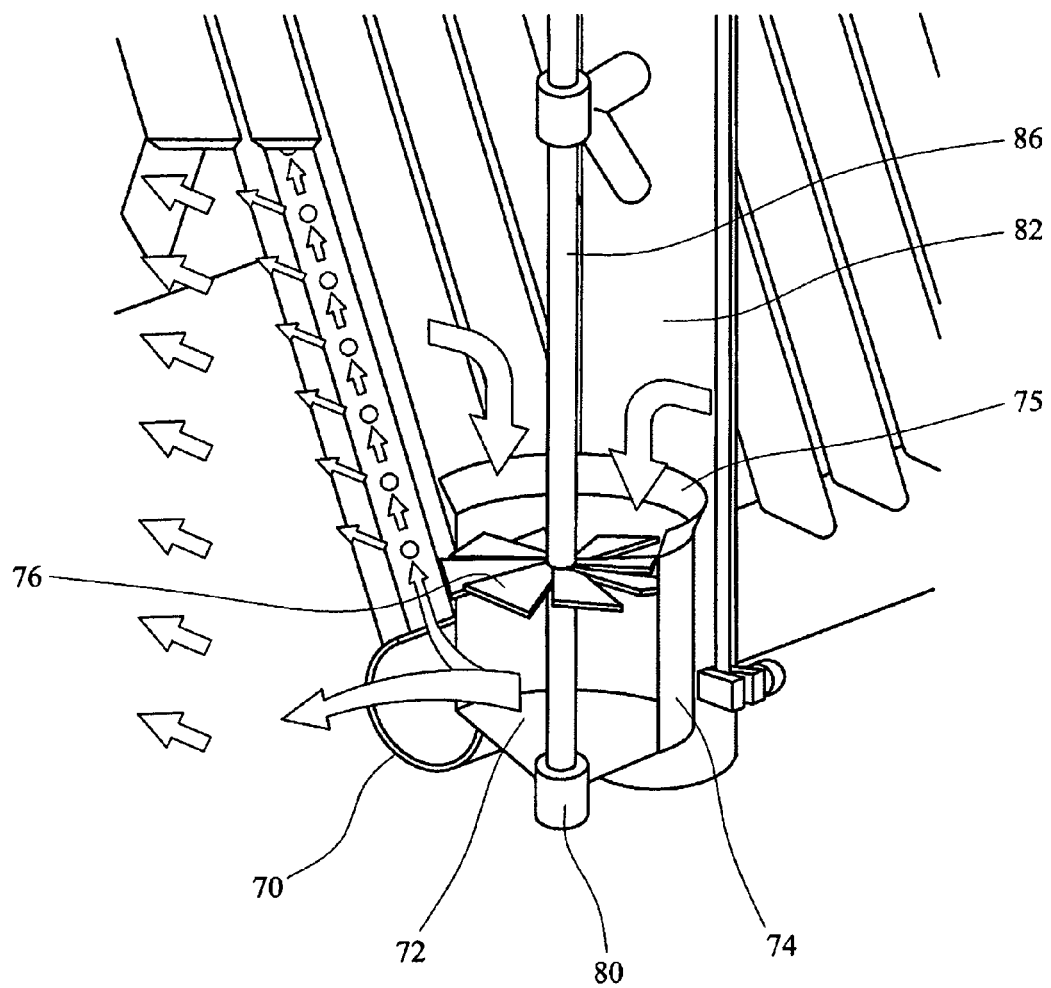

FIGS. 6, 7 and 8 show a further embodiment of the invention. In this case, two pipe sections 50, 52 are provided, each comprising an arrangement of first and second 'vertical' pipes that are spaced apart at their lower ends 54 but are sloped so as to be close together at their upper ends 56. The pipe sections 50, 52 comprise planar arrays of first 58a, 58b and second 60a 60b pipes respectively, the arrays being parallel but offset (i.e. substantially as shown in plan in FIGS. 1 and 2) and arranged such that the first pipes 58a, 58b are one the outside. Pipes 60a and 60b are buoyant.

The pipe sections 50, 52 are mounted on a triangular frame structure 62 which is provided with buoyant end members 64 and a buoyant top chord member 66 which allow the apparatus to float in the water with only the upper part 56 at or above the water surface 68. The two lower chord members 70a, 70b constitute manifolds to which the first pipes 58a, 58b are connected such that water can flow therebetween.

The lower chord members 70a, 70b are connected to the outlet end 72 of flow conduits 74 defining impeller shrouds that have inlets 75 open to the water at an upper part thereof. Each shroud 74 houses an impeller 76 mounted on a boss 80 at the bottom of the shroud 74. A support column 82 extends up from the lower chord member 70a, 70b adjacent each shroud 74 to a level above the upper part of the pipe structure 56 where a generator module 84 is mounted such that when the structure is floating in the body of water, it is normally held above the water level 68. A drive shaft 86 extends between the impeller 76 and the generator module 84, rotation of the impeller 76 serving to drive a generator to generate electricity.

In use, the structure is anchored to the sea bed such that it positioned substantially across the general direction of current or tidal flow, or the predominant wave direction. By positioning the structure in this way, pumping of water through the first pipes will occur as long as there is a component of flow that runs through the pipe sections 50, 52.

The invention addresses various problems commonly encountered with wave or tidal power generation. One problem arises from the fact that flow in such cases varies substantially with depth and is not constant. By providing the elongate pipes, each can be positioned in such a way that there is always a part of it in an optimum flow region. The use of the non-return valves means that the tendency to draw water into the first pipe to compensate for the pressure drop caused by the venturi is resisted. Another problem arises from the fact that the direction of flow often changes direction by 180° or more, such as in tidal flows or in a typical wave. By providing the venturi between the two sets of pipes, a system can be provided that responds to all flows rather than just in one direction.

By making the structure buoyant as in the embodiment of FIGS. 6-8, deeper, open water areas can be accessed, which gives more flexibility to locate the device out of shipping lanes and out of sight from land. Energy can be extracted from any water movement between the bars irrespective of the frequency of the incident energy even at near-zero frequency i.e. tidal flows.

Typical dimensions of a modular unit of the structure can be, for example, 72.1 m long overall, with each side of the triangular cross section 18 m, weighing around 3750 tonnes. There is no theoretical limit to the total length where many modular lengths are connected together.

Current or wave action causes flow past the pipes, creating low pressure in the venturi which in turn induces flow past the impellers, turning the generators. The angled inclination gives an elliptical venturi profile for horizontal current flow which is considered better than a circular profile. In general, wave action will also cause water particle flows between the bars at an angle, giving an elliptical venturi profile. The concept is omni-directional—it doesn't matter is the tide coming in or out, or if the device sits in a wave crest or trough. Any movement in the water can generate power. Some optimization may be possible by paying the mooring lines in and out to rotate the whole device in plan into the prevailing wave and current "rose". By having the top chord lying in the still water surface, however, much of the surplus energy of storm waves can be allowed to pass over the structure without overloading the system. While the system may not generally have high thermodynamic efficiency, it can be very large and very robust, with all the electrical generation up out of the water so as to be able to work consistently and reliably in all conditions.

Rigid-body movements (heave, pitch, roll) of the whole structure can also cause flow between the bars, converting further wave energy.

The columns on which the generators sit can be open-bottomed so that they fill with water from the lower chord, with a closed air volume above the water surface inside the column. By selecting the volume of the air in these columns, and by fine-tuning that air volume during operation by adjusting its pressure, two improvements can be made to performance:

The cushion of air will expand when the flow in the lower chord is high and its pressure low, with the column partly emptying, relieving the flow through the shroud, past the impellers and reducing peak surges in the power generated. Conversely, when the wave energy cycle then causes minimum flow in the lower chord at higher pressure, the expanded air cushion induces water to flow back in up the column, enhancing flow past the impeller and smoothing the energy produced.

This is a resonant phenomenon that can be taken advantage of to enhance efficiency in detailed design.

A further embodiment of the invention uses the energy generated to drive conventional reverse-osmosis desalination equipment, with the fresh water exported by pipeline—this avoids that traditional problem of getting access to unsilted open sea water and generating the power needed for the high-pressure pumps these units need, in undeveloped coastal sites.

The units can be very large which can go some way to addressing energy lost by the flow simply going around the ends in a tidal or current flow. However, even with a large structure, only part of the incident water stream goes through the bars—the rest slips around the sides, because the tubes present a significant blockage to the tidal flow.

Figure 9:
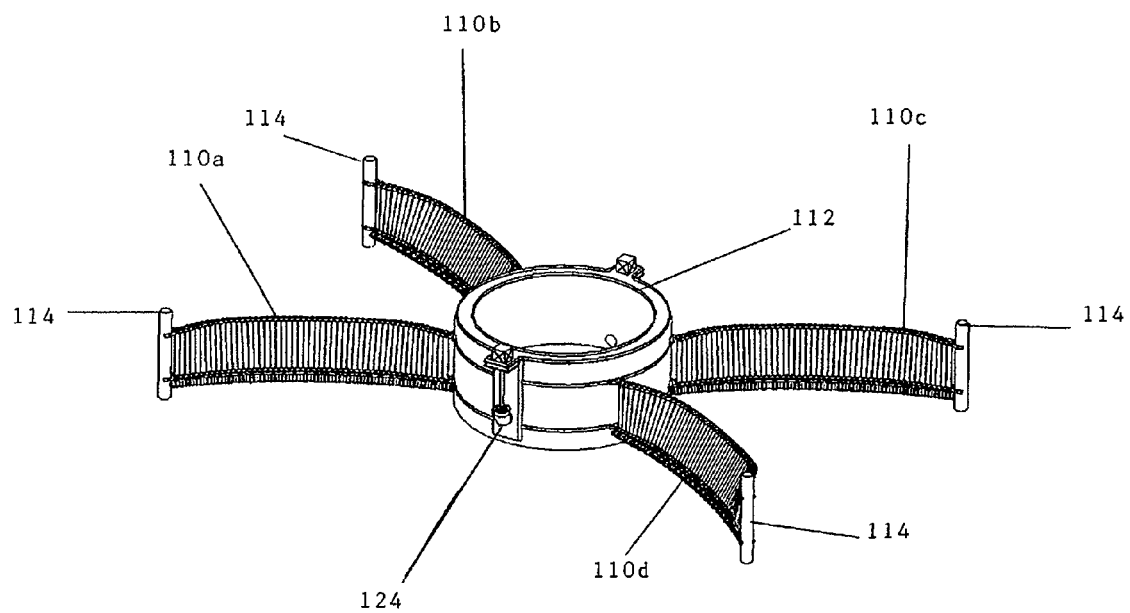
FIG. 9 shows a fourth embodiment of the invention.
Figure 10:
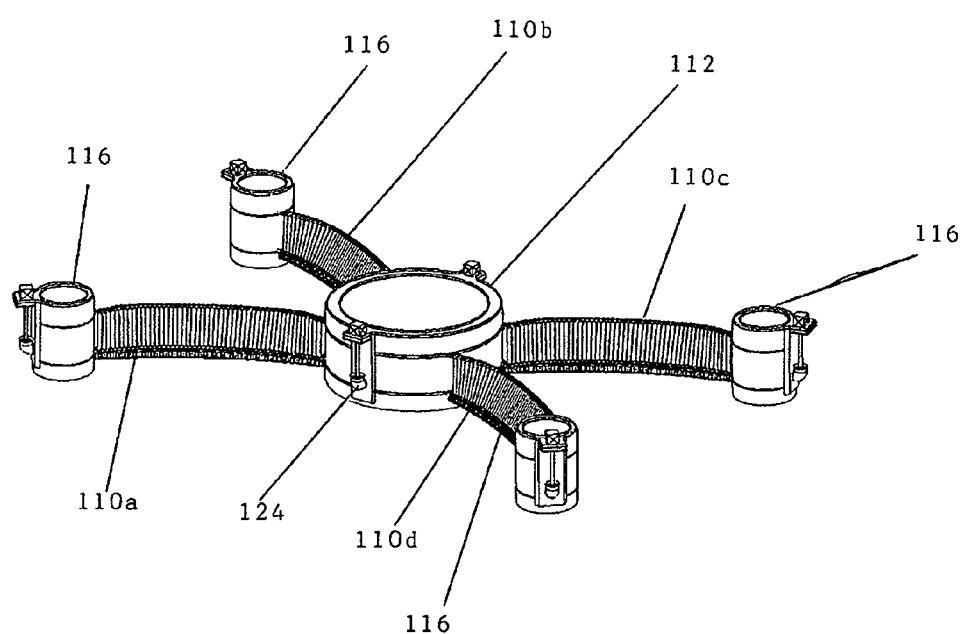
FIG. 10 shows a fifth embodiment of the invention.

One approach to address this is shown in FIG. 9 and comprises two arrays of pipes forming a pair of "fences" 110a, 110b that are connected at one end to a common structure (in this case a large, concrete reservoir 112 as will be described further below) and the other ends spaced apart and connected to piles 114 to form a V-shape, to "catch" the tidal or current flow as it spreads out from the middle third of the upstream flow. Because the tide is bi-directional, another pair of fences 110c, 110d can be provided in an opposed V, resulting in an X-shaped arrangement of fences 110. The concrete reservoir 112 also blocks the central area, helping guide the flows through the fences 110. FIG. 10 shows an optional version in which the outer ends of the fences 110 are supported on smaller reservoirs 116 rather than piles.

While these embodiments are configured to extract energy from tidal or current flows, wave energy will also be converted in the manner described above.

Figure 11:
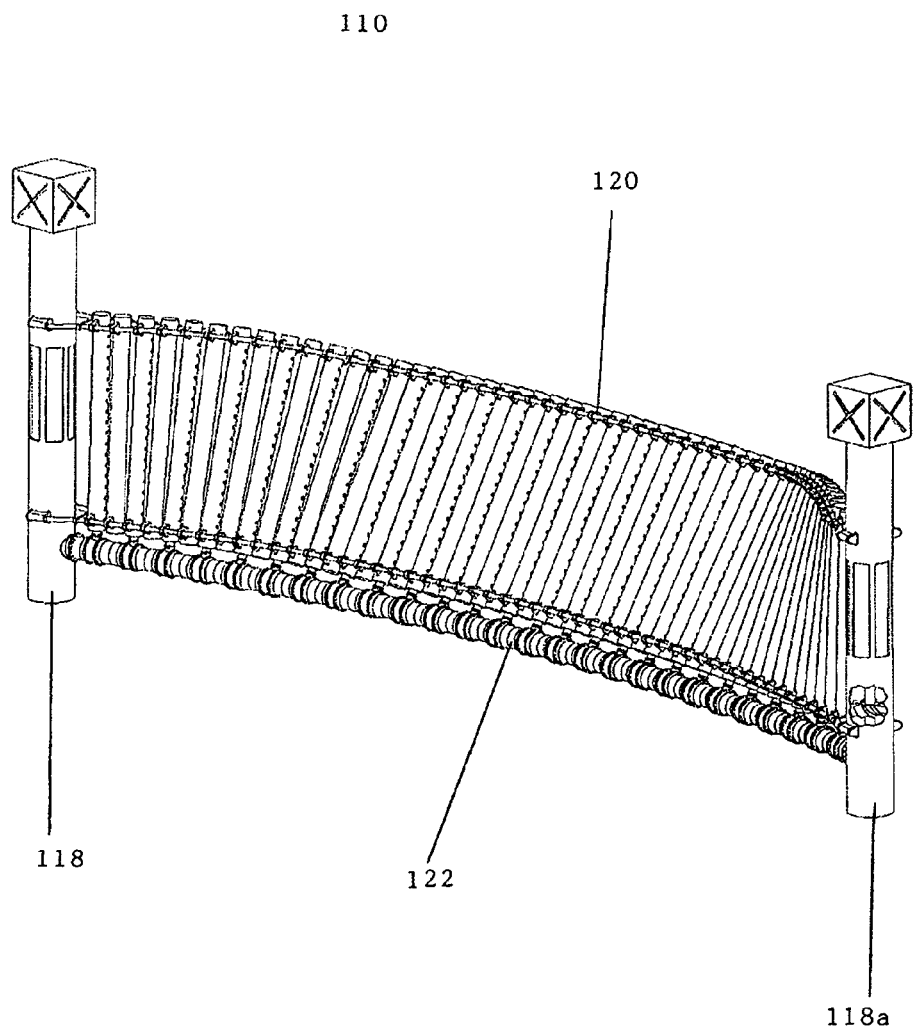
FIG. 11 shows detail of the fence of FIG. 9.
Figure 12:
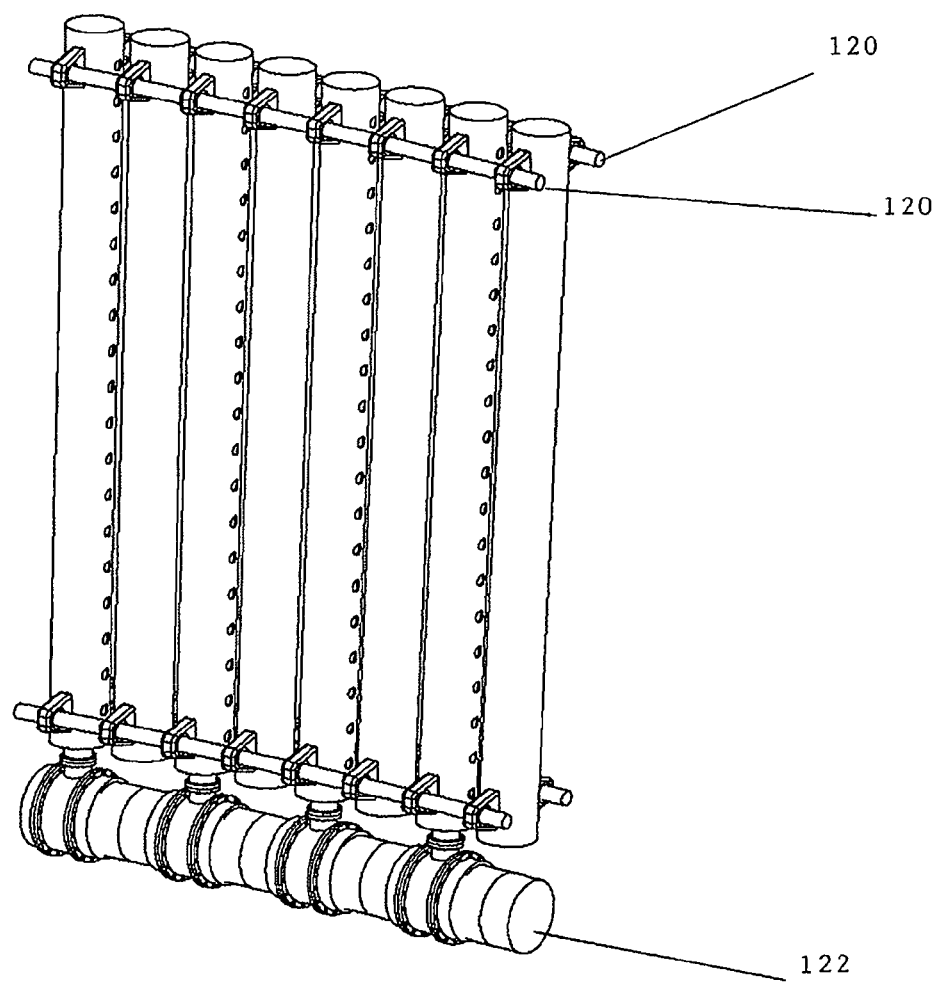
FIG. 12 shows further detail of the fence of FIG. 11.

Allowing the fences 110 stretch down-current into a catenary helps avoid high bending moments in the fence by making it flexible so as to only tension forces. FIGS. 11 and 12 shows one such embodiment, wherein the pipes forming the fence 110 are slung between two piles 118a, 118b, as shown (impellers may be housed in the piles). In one preferred embodiment, every other tube is buoyant such that the whole "fence" 110 is slightly buoyant, and hogs upward into a slight arch at slack water. The individual tubes can be strung together using steel or artificial fibre ropes 120 at the top, (and intermediate elevations, when present), with the lower horizontal manifold 122 helping to hold the bottom of the pipes in place. The upper ropes 120 can be more flexible than the manifold 122, ensuring an inclination of the pipes, helping present a desirable elliptical flowpath to the tidal or current flow through the venturi pipes.

As is described above in relation to FIGS. 9 and 10, the fences 110 are connected to a large concrete reservoir or sump tank 112 such that the fences 110 can draw water from the inside of the tank, which is refilled continuously by arranging flow from the outside to the inside at high tide through impellers 124 that generate electricity.

One benefit of this approach is that the energy conversion capacity of a fence in a tidal flow is highest when the tidal currents are high, and zero at slack tide. The energy demands of a distribution grid, however, may be at different times, with peak demands usually during the day, when the tidal flow may be minimal, and vice versa. By providing a sump tank or reservoir 112 as shown, the electrical generating cycle can be de-coupled from the tidal cycle and contractual power sales may now made against a fixed daily time-scale, independently of the tide tables.

Another benefit is that the impeller 124 in use at any one time can be located in the tank wall at a point in the plan view that is diametrically opposite the compass point from which the tide is flowing. This will stimulate a circulation around the tank 112 that mitigates against the formation of large vortices behind the tank 112, wasting energy, and helping to draw the divided tidal flow through all four fences 110, maximising the energy conversion efficiency.

Figure 13:
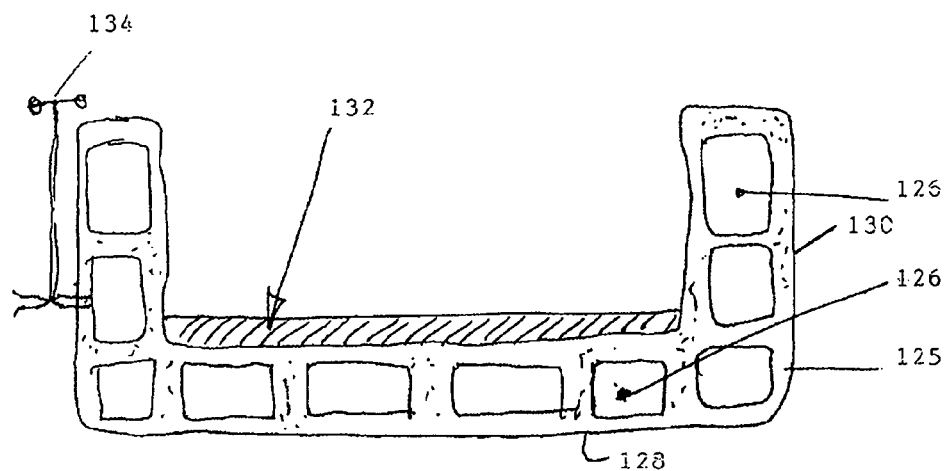
FIGS. 13-15 show details of a reservoir as used in the embodiments of FIG. 9 or 10.
Figure 14:
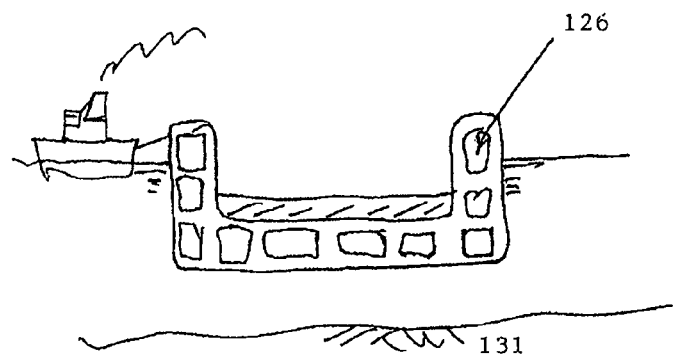
Figure 15:
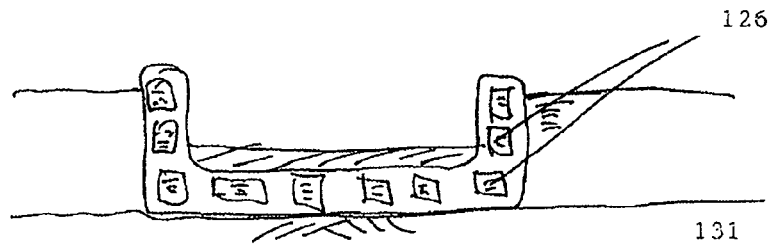

When the reservoir is empty, the tank will be highly buoyant and must therefore be sufficiently heavy to keep it on the sea bed. However, it is also desirable to be able to float-out the reservoir to location during installation. FIGS. 13-15 show an embodiment that achieves this, the reservoir being formed from a reinforced concrete structures 125 comprising hollow chambers 126 formed in the base 128 and optionally, in the walls 130, that are air-filled during tow-out (FIG. 14) but flooded during operation to sit on the sea bed 131 (FIG. 14). It may also be desirable to have further ballast, iron ore 132 for example, which may be cheaper than simply using more concrete than is necessary for structural purposes. The tank can be un-installed by replacing the water in the chambers 126 with air again, reversing the installation process, either by pumping out the water in the chambers or blowing it out with compressed air. A valve 134 can be provided to allow venting of the chambers.

Further changes can be made while remaining within the scope of the invention. For example, while the pipes in the examples given above are essentially circular in cross-section, it is also possible to use pipes that are elliptical in the direction of flow or have other profiles to reduce turbulence. One way to achieve this is to use circular section pipes that are set at an angle to vertical. This means that an elliptical profile is presented to a horizontal flow. Other variations are possible

The invention claimed is:

1. Apparatus for generating electricity using tidal or current flow in a body of water, comprising:
    an arrangement of first and second pipes defining a partition having opposing sides, each of the first pipes being provided with a series of holes spaced along a length thereof, and the first pipes being arranged relative to the second pipes such that a venturi is defined between the walls of adjacent ones of the first and second pipes;
    a flow conduit having an inlet and an outlet;
    an impeller located in the flow conduit; and
    a generator connected to the impeller;
    wherein water from the body can enter the flow conduit via the inlet, and the first pipes are connected to the outlet of the flow conduit such that flow of water past the arrangement of first and second pipes from either one of the opposing sides of the partition defined by the arrangement of first and second pipes causes the first pipes to act as venturi pumps, drawing water through the flow conduit and driving the impeller.

2. Apparatus as claimed in claim 1, wherein the series of holes comprises a row of holes extending axially along the side of the first pipe.

3. Apparatus as claimed in claim 2, comprising a pair of parallel, symmetrical rows of holes.

4. Apparatus as claimed in claim 1, wherein non-return valves are provided at the holes such that water can flow through the holes out of the first pipes but not through the holes into the first pipes.

5. Apparatus as claimed in claim 4, wherein the non-return valve comprises a flap of flexible material secured to the outside of the first pipe and extending over the holes, such that, in use, the induced flow lifts the flap off the holes and allows outward flow but reverse flow pushes the flap against the hole and prevents flow therethrough.

6. Apparatus as claimed in claim 5, wherein the flap covers more than one hole.

7. Apparatus as claimed in claim 6, wherein the series of holes comprises a pair of parallel, symmetrical rows of holes and the non-return valve comprises a separate flap arrangements secured on each side of the pair of holes, the free edges of the flaps lying between the two rows of holes.

8. Apparatus as claimed in claim 7, wherein the series of holes comprises a pair of parallel, symmetrical rows of holes and the non-return valve comprises separate flap arrangements are secured to the pipe between the pair of parallel, symmetrical rows of holes, each flap extending over one or other of the rows.

9. Apparatus as claimed in claim 1, wherein the first pipes are substantially vertical and connected to a horizontal manifold at their lower ends, the manifold in turn being connected to the flow conduit.

10. Apparatus as claimed in claim 1, wherein the first and second pipes are substantially horizontal and the first pipes are connected to a vertical manifold, the manifold in turn being connected to the flow conduit.

11. Apparatus as claimed in claim 1, wherein the arrangement of first and second pipes comprises first and second sections inclined towards each other towards their upper ends.

12. Apparatus as claimed in claim 1, wherein the flow conduit defines a shroud surrounding the impeller.

13. Apparatus as claimed in claim 1, wherein the impeller is located near a lower end of the arrangement of the first and second pipes, the generator is located near an upper end of the arrangement of first and second pipes, and the generator is connected to the impeller by means of an elongate drive shaft.

14. Apparatus as claimed in claim 13, wherein the generator is mounted such that when the apparatus is positioned in the body of water, the generator is above the water level.

15. Apparatus as claimed in claim 14, wherein adjustable mooring lines are provided to attach the apparatus to the bed of the body of water to allow the alignment of the apparatus to be adjusted so as to optimise flow past the pipes.

16. Apparatus as claimed in claim 1, further comprising buoyancy members arranged such that the apparatus will float in the body of water with the arrangement of first and second pipes substantially submerged in the body of water.

17. Apparatus as claimed in claim 16, wherein the buoyancy member comprises an open-bottomed column that can fill with water with a closed air volume above the water surface inside the column.

18. Apparatus as claimed in claim 17, wherein means are provided for adjusting the air pressure in the column so as to fine-tune the air volume.

19. Apparatus as claimed in claim 17, wherein the column is connected to the flow conduit such that the closed volume of air can expand when the flow in the flow conduit is high and its pressure low and partly empty the column into the conduit past the impeller, and when the flow is low and its pressure high, the water to flow back in up the column.

20. Apparatus as claimed in claim 17, wherein the column is used to mount the generators and/or the impellers.

21. Apparatus as claimed in claim 1, wherein the pipe arrangement comprises a substantially planar array of first pipes in a spaced, parallel arrangement and a substantially planar array of second pipes in a spaced, parallel arrangement.

22. Apparatus as claimed in claim 21, wherein the plane of the array of first pipes is substantially parallel to and offset from that of the array of second pipes.

23. Apparatus as claimed in claim 21, wherein the arrays of first and second pipes are substantially coplanar, the pipes of one array being interleaved with those of the other.

24. Apparatus as claimed in claim 21, wherein the arrays define an elongate fence of first and second pipes.

25. Apparatus as claimed in claim 24, wherein a pair of fences is provided, one end of each fence being connected at a common location and the other ends being spaced apart such that the fences from a V shape.

26. Apparatus as claimed in claim 25, wherein two pairs of fences are provided, one end of each fence being connected at the common location and the ends being spaced to form an X shape.

27. Apparatus as claimed in claim 25, wherein the pipes forming the arrays are connected flexibly such that the fence can deform from a planar arrangement under the effect of tidal or current flow.

28. Apparatus as claimed in claim 27, wherein the flexible connections are provided by a manifold at the bottom of the fence and one or more flexible cables above the manifold, the cables being more flexible than the manifold.

29. Apparatus as claimed in claim 25, further comprising a reservoir at the common location to which the fences are connected, the outlet of the flow conduits feeding into the reservoir.

30. Apparatus as claimed in claim 29, wherein the reservoir is arranged to release stored water into the apparatus at times of low tidal or current flow.

31. Apparatus as claimed in claim 29, wherein the impeller is mounted in a wall of the reservoir.

32. Apparatus as claimed in claim 29, wherein the outer ends of the fences are connected to further reservoirs which also act to support the end of the fence.

\* \* \* \* \*

UNITED STATES PATENT AND TRADEMARK OFFICE
CERTIFICATE OF CORRECTION

PATENT NO.        : 8,446,031 B2                                          Page 1 of 1
APPLICATION NO.   : 12/375405
DATED             : May 21, 2013
INVENTOR(S)       : Peter Roberts It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1023 days.

Signed and Sealed this
Twenty-third Day of December, 2014

Michelle K. Lee
*Deputy Director of the United States Patent and Trademark Office*